(12) United States Patent
An et al.

(10) Patent No.: US 11,346,218 B1
(45) Date of Patent: May 31, 2022

(54) GUIDING TYPE MINIATURE PIPE-JACKING CONSTRUCTION METHOD

(71) Applicants: Guangzhou Municipal Engineering Group Ltd., Guangzhou (CN); Shaoguan TieYou Construction Machinery CO., LTD, Shaoguan (CN)

(72) Inventors: Guanfeng An, Guangzhou (CN); Jingda Ouyang, Guangzhou (CN); Haibin Yu, Guangzhou (CN); Rong Zhang, Guangzhou (CN); Tianjun Liu, Guangzhou (CN); Tan Wang, Guangzhou (CN); Yuanwen Li, Guangzhou (CN); Zhaobao Hou, Guangzhou (CN); Deyi Xu, Guangzhou (CN)

(73) Assignee: GUANGZHOU MUNICIPAL ENGINEERING GROUP LTD., Shaoguan (CN)

( * ) Notice: Subject to any disclaimer, the term of this patent is extended or adjusted under 35 U.S.C. 154(b) by 0 days.

(21) Appl. No.: 17/515,340

(22) Filed: Oct. 29, 2021

(30) Foreign Application Priority Data

Aug. 3, 2021 (CN) .......................... 202110888004.8

(51) Int. Cl.
*E21D 9/12* (2006.01)
*E21D 9/10* (2006.01)
*E21D 9/00* (2006.01)
*F16L 1/06* (2006.01)
*F16L 1/028* (2006.01)

(52) U.S. Cl.
CPC ........... *E21D 9/1006* (2013.01); *E21D 9/008* (2016.01); *F16L 1/028* (2013.01); *F16L 1/06* (2013.01)

(58) Field of Classification Search
CPC ....... E21D 9/005; E21D 9/1006; E21D 9/008; E21B 7/20; F16L 55/1658; F16L 1/036; F16L 1/028; F16L 1/06; E03F 3/06
See application file for complete search history.

(56) References Cited

U.S. PATENT DOCUMENTS

| | | | | |
|---|---|---|---|---|
| 1,879,683 A | * | 9/1932 | Henderson | E02F 5/102 294/90 |
| 2,325,565 A | * | 7/1943 | Williams | E21B 7/046 405/184 |

(Continued)

*Primary Examiner* — Benjamin F Fiorello
(74) *Attorney, Agent, or Firm* — Getech Law LLC; Jun Ye

(57) ABSTRACT

Provided is a guiding type miniature pipe-jacking construction method, comprising the following steps: in an originating well, perforating an operation hole in an inner wall of the originating well with a trepanning apparatus; mounting a laser orientation instrument and a laser guided drill bit, driving a guide bar connected with the laser guided drill bit into the opened operation hole with a thrusting apparatus, and driving the guide bar into a soil mass with the thrusting apparatus; jacking a plurality of mud discharging pipes following the guide bar successively into the soil mass with the thrusting apparatus; jacking a plurality of mud discharging screw rods into the mud discharging pipes with the thrusting apparatus; jacking a pipe-jacking machine head following the mud discharging pipes into the soil mass with the thrusting apparatus, a cutter head on the pipe-jacking machine head rotating to drive the mud discharging screw rods to rotate.

7 Claims, 3 Drawing Sheets

(56) References Cited

U.S. PATENT DOCUMENTS

| | | | | |
|---|---|---|---|---|
| 4,020,641 A * | 5/1977 | Takada | E21B 7/046 | 405/184 |
| 4,024,721 A * | 5/1977 | Takada | E21B 7/046 | 405/184 |
| 4,116,011 A * | 9/1978 | Girault | E21D 9/005 | 405/134 |
| 4,403,890 A * | 9/1983 | Miyanagi | E21B 7/24 | 173/10 |
| 5,165,490 A * | 11/1992 | Nosaka | E21B 47/024 | 175/45 |
| 5,314,267 A * | 5/1994 | Osadchuk | E21B 21/00 | 175/53 |
| 5,482,404 A * | 1/1996 | Tenbusch, II | E21B 7/20 | 405/184 |
| 5,484,232 A * | 1/1996 | Hayashi | E21B 7/20 | 405/184 |
| 5,505,558 A * | 4/1996 | Brown | E21B 7/20 | 175/53 |
| 5,597,045 A * | 1/1997 | Sass | E21B 43/082 | 175/62 |
| 5,597,046 A * | 1/1997 | Fisk | E21B 7/046 | 175/19 |
| 5,628,585 A * | 5/1997 | Parish, II | E03F 3/06 | 175/53 |
| 5,979,574 A * | 11/1999 | Osadchuk | E21B 7/046 | 175/353 |
| 6,082,471 A * | 7/2000 | Osadchuk | E21B 7/046 | 175/108 |
| 7,070,359 B2 * | 7/2006 | Richardson | E21B 7/20 | 175/113 |
| 7,389,831 B2 * | 6/2008 | Mullins | E21B 7/046 | 175/215 |
| 7,753,140 B2 * | 7/2010 | Barbera | E21B 7/046 | 175/62 |
| 7,779,938 B2 * | 8/2010 | Barbera | E21B 7/201 | 175/388 |
| 8,011,449 B2 * | 9/2011 | Roth | E21B 21/00 | 175/53 |
| 8,113,741 B1 * | 2/2012 | Vidovic | E21B 7/046 | 405/184 |
| 8,210,774 B1 * | 7/2012 | Vidovic | E21D 9/005 | 405/143 |
| 2011/0079469 A1 * | 4/2011 | Tjader | F16L 55/1658 | 184/14 |

* cited by examiner

GUIDING TYPE MINIATURE PIPE-JACKING CONSTRUCTION METHOD

TECHNICAL FIELD

The present invention relates to the technical field of pipe-jacking construction, in particular to a guiding type miniature pipe-jacking construction method.

BACKGROUND

With development of urban construction, in particular, acceleration of reconstruction of old city, various small pipe diameter pipeline burying projects are increased continuously. Conventional slotting construction is increasingly inadaptive to construction requirements as a road is destroyed, the traffic is affected, the environment is polluted and the like, and pipe-jacking construction may solve the problem effectively.

However, the current pipe-jacking construction precision remains to be improved and the construction cost is high, so that it is necessary to design a guiding type miniature pipe-jacking construction method for improving the construction precision and lowering the construction cost.

SUMMARY

In order to solve the technical scheme, the present invention aims to provide a guiding type miniature pipe-jacking construction method. In order to solve the technical scheme, the present invention is realized by adopting the following technical scheme.

A guiding type miniature pipe-jacking construction the method includes the following steps:

S1, in an originating well, perforating an operation hole in an inner wall of the originating well with a trepanning apparatus, and meanwhile, guniting and fixing a soil mass in the periphery of the operation hole;

S2, mounting a laser orientation instrument and a thrusting apparatus in the originating well, the laser orientation instrument and a laser guided drill bit being connected wirelessly, the laser guided drill bit being connected with one end of one of guide bars, driving the guide bar connected with the laser guided drill bit into the opened operation hole with the thrusting apparatus, and then driving more than two guide bars successively into the operation hole with the thrusting apparatus until one end of one of the guide bars enters a receiving well;

S3, mounting a funnel-shaped pushing head at one end of a mud discharging pipe, jacking the mud discharging pipe provided with the pushing head following the guide bar in the soil mass with the thrusting apparatus, the pushing head leaning against one end of one of the guide bars, and then jacking more than two mud discharging pipes following the mud discharging pipe provided with the pushing head into the soil mass with the thrusting apparatus until all the guide bars are jacked out into the receiving well, and moving all the guide bars entering the receiving well out of the receiving well;

S4, when one of the mud discharging pipes enters the receiving well, jacking more than two mud discharging screw rods into the mud discharging pipes with the thrusting apparatus until one of the mud discharging screw rods enters the receiving well;

S5, jacking a pipe-jacking machine head following the mud discharging pipe at the tail end into the hole with the thrusting apparatus, a cutter head arranged at one end of the pipe-jacking machine head rotating to drive all the mud discharging screw rods to rotate, the cutter head cutting the soil mass, the cut soil mass entering a soil pressure cabin arranged at the other end of the pipe-jacking machine head, and the soil mass in the soil pressure cabin being discharged to the originating well or the receiving well via the mud discharging screw rods and the mud discharging pipes; and S6, jacking more than two prefabricated pipe joints following the pipe-jacking machine head into the soil mass with the thrusting apparatus until all the mud discharging screw rods, the guide bars and the pipe-jacking machine head are jacked out into the receiving well to complete laying of an underground pipeline.

Beneficially, one end of each of the guide bars in the S2 is provided with a loosening agent spraying apparatus, and when the guide bar is driven into the soil mass, the loosening agent spraying apparatus sprays a loosening agent to soil.

Beneficially, the laser orientation instrument is independently mounted on concrete at the bottom of the originating well.

Beneficially, the pipe-jacking machine head is a tunneling cutting type pipe-jacking machine head.

Beneficially, the pipe-jacking machine head is an extrusion type pipe-jacking machine head.

Beneficially, in the S5, when the cutter head rotates towards a direction, the soil mass in the soil pressure cabin is discharged to the originating well via the mud discharging screw rods and the mud discharging pipes.

Beneficially, in the S5, when the cutter head rotates towards a direction, the soil mass in the soil pressure cabin is discharged to the receiving well via the mud discharging screw rods and the mud discharging pipes.

The present invention has the beneficial effects that the thrusting apparatus of the present invention is small in size, light in weight, convenient to operate and high in construction efficiency, may perform construction in a narrow roadway space, may perform construction in a working well with a diameter of 1800 mm, and is suitable for a pipeline project with a relatively small diameter; wide stratums, for example various soil layers such as flow plastic clay, soft clay, hard pan, a sand bed, a gravel bed with a diameter smaller than 50 mm, may be suitable for the construction method of the present invention; the rotating direction of the cutter head may be controlled according to an actual condition, so that the soil mass is controlled to be discharged to the originating well or the receiving well, it is convenient to process the abandoned soil or mud, and the slurry disposal cost is lowered; and the construction quality is excellent; as guided by an advanced laser guiding drill bit, a straightness error of a guide bar is +/−2.5 cm; after construction of the pipeline, the straightness is high without disjoint and water leakage, water leakage between joints due to excessive balanced deviation rectification of mud and water is avoided, and a strict requirement on a gravity flow is met fully.

BRIEF DESCRIPTION OF THE DRAWINGS

Further description of the present invention is made by drawings and the embodiments in the drawings do not constitute limitation to the present invention. Those of ordinary skill in the art further may obtain other drawings according to the drawings without creative efforts.

Figure 1:
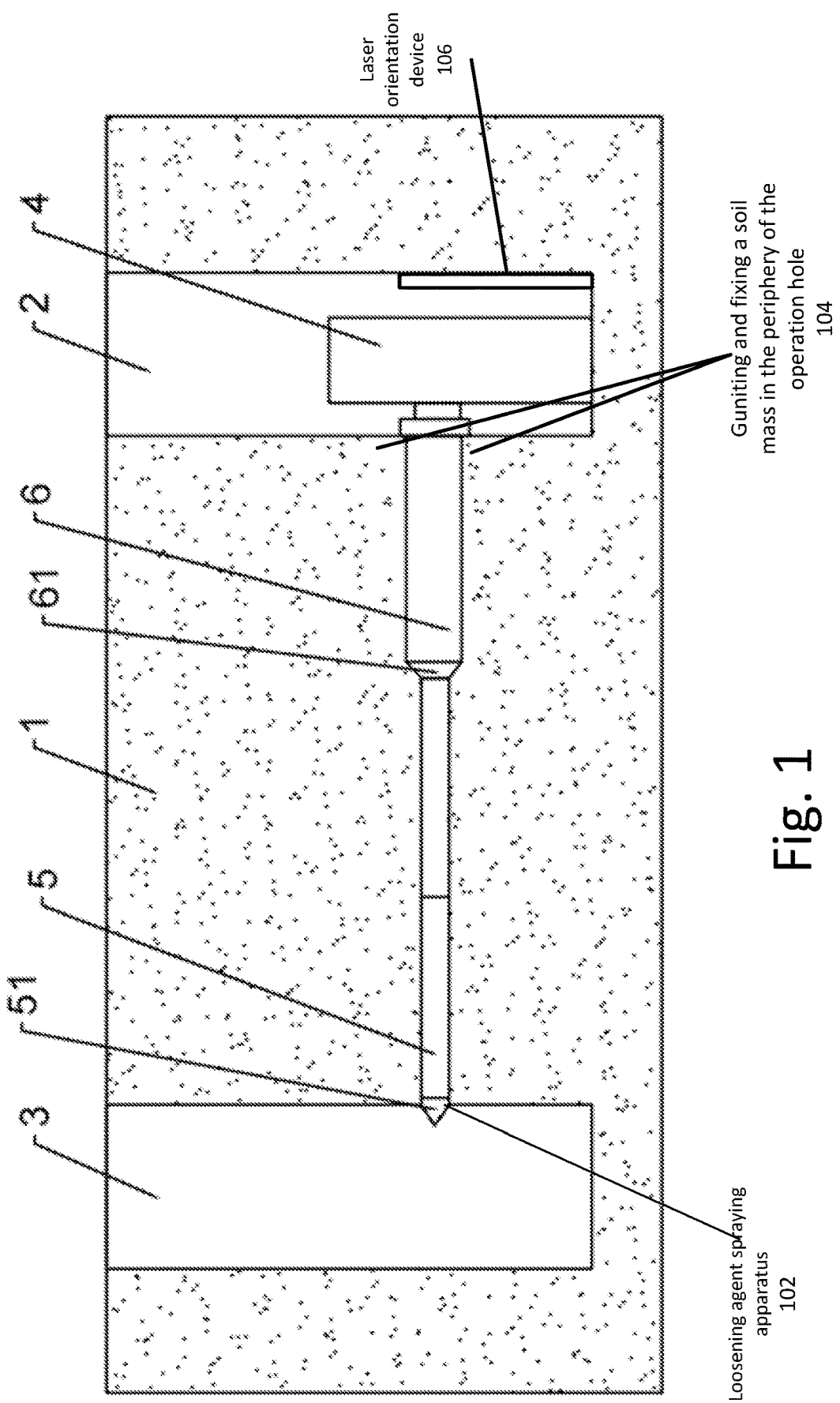
FIG. 1 is a structural schematic diagram of construction in the S3 of a guiding type miniature pipe-jacking construction method.

Marks of drawings: soil mass 1, originating well 2, receiving well 3, thrusting apparatus 4, guide bar 5, laser guided drill bit 51, mud discharging pipe 6, thrusting head 61, mud discharging screw rod 7, pipe-jacking machine head 8, cutter head 81, soil pressure cabin 82, prefabricated pipe joint 9.

DETAILED DESCRIPTION

Clear and intact description will be made on technical scheme in the embodiment of the present invention below in combination with drawings in the embodiment of the present invention. The described embodiments are merely a part of embodiments of the present invention and are not all the embodiments. On a basis of the embodiments in the present invention, all other embodiments obtained by those skilled in the technical field without creative efforts fall into the scope of protection of the present invention.

In description of the present invention, it is to be noted that orientation or position relationships indicated by terms: 'vertical', 'upper', 'lower', 'horizontal' and the like are orientation or position relationships indicated by the drawings and are only to describe the application and simplify the description rather than indicates or implies that the indicated device or components must have specific orientations and are configured and operated in the specific orientations. Therefore, it cannot be construed as limitations to the present invention. In addition, the terms 'first', 'second', 'third' and 'fourth' are only used for a description purpose rather than being construed to indicate or imply relative importance.

In the description of the present invention, it is to be further noted that unless otherwise specified and defined, terms 'arranging', 'mounting', and 'connecting', 'connection' should be understood in a broad sense, for example, arranging', 'mounting', and 'connecting', 'connection' can be either fixed connection or detachable connection or integrated connection; can be either mechanical connection, electric connection or direct connection and can be either connection via an intermediation or internal communication of two components. Those skilled in the art can understand specific meaning of the terms in the present invention under specific circumstances.

Figure 2:
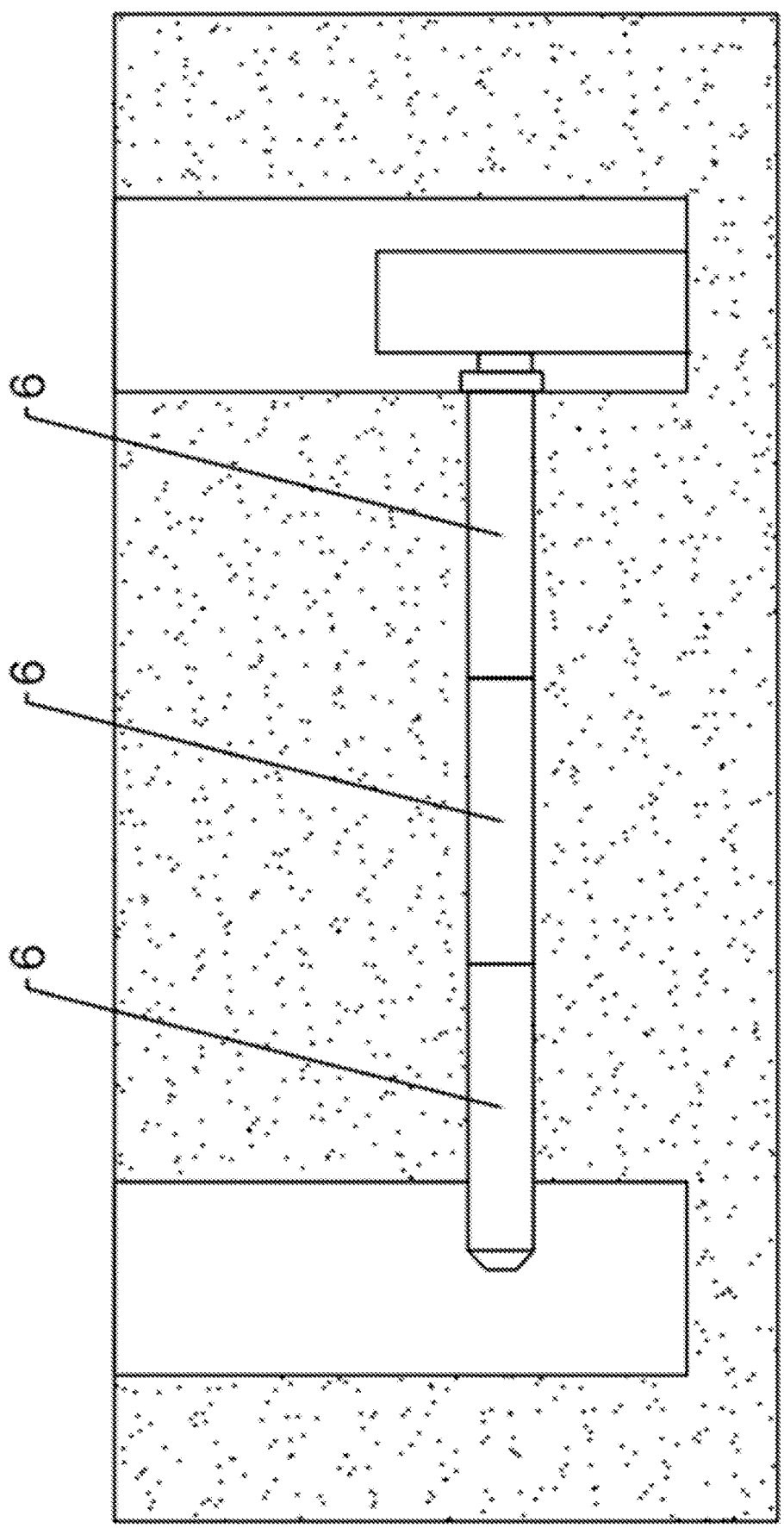
FIG. 2 is a structural schematic diagram when the S3 of a guiding type miniature pipe-jacking construction method is finished.
Figure 3:
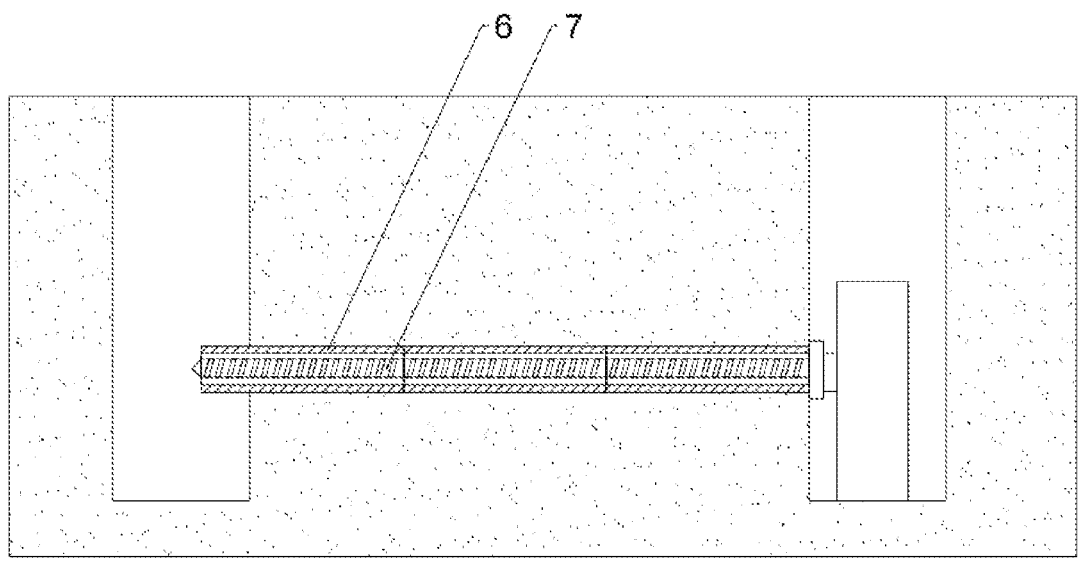
FIG. 3 is a structural schematic diagram of construction in the S4 of a guiding type miniature pipe-jacking construction method.
Figure 4:
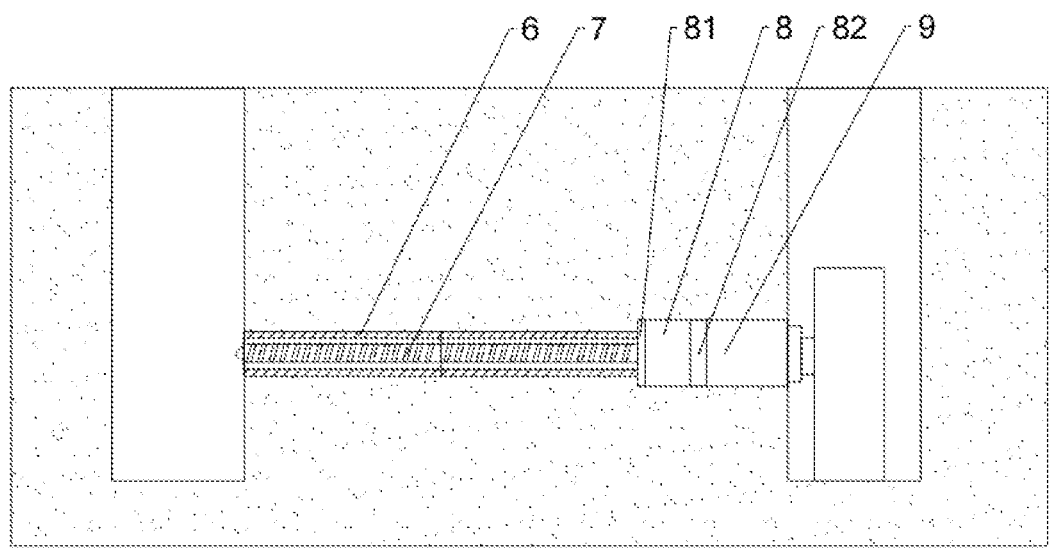
FIG. 4 is a structural schematic diagram of construction in the S6 of a guiding type miniature pipe-jacking construction method.

As shown in FIG. 1-4, a guiding type miniature pipe-jacking construction the method includes the following steps:

S1, in an originating well 2, an operation hole is perforated in an inner wall of the originating well 2 with a trepanning apparatus, and meanwhile, a soil mass 1 in the periphery of the operation hole is gunited and fixed;

S2, a laser orientation instrument and a thrusting apparatus 4 are mounted in the originating well 2, the laser orientation instrument and a laser guided drill bit 51 being connected wirelessly, the laser guided drill bit 51 being connected with one end of one of guide bars 5, driving the guide bar 5 connected with the laser guided drill bit 51 into the opened operation hole with the thrusting apparatus 4, and then driving more than two guide bars 5 successively into the operation hole with the thrusting apparatus 4 until one end of one of the guide bars enters a receiving well;

S3, a funnel-shaped pushing head 61 is mounted at one end of a mud discharging pipe 6, the mud discharging pipe 6 provided with the pushing head 61 following the guide bar 5 is jacked into the soil mass 1 with the thrusting apparatus 4, the pushing head 61 leaning against one end of one of the guide bars 5, and then more than two mud discharging pipes 6 following the mud discharging pipe 6 provided with the pushing head 61 are jacked into the soil mass 1 with the thrusting apparatus 4 until all the guide bars 5 are jacked out into the receiving well 3, and moving all the guide bars 5 entering the receiving well 3 out of the receiving well 3;

S4, when one of the mud discharging pipes 6 enters the receiving well 3, more than two mud discharging screw rods 7 are jacked into the mud discharging pipes 6 with the thrusting apparatus 4 until one of the mud discharging screw rods 7 enters the receiving well 3;

S5, a pipe-jacking machine head 8 following the mud discharging pipe 6 at the tail end is jacked into the hole with the thrusting apparatus 4, a cutter head 81 arranged at one end of the pipe-jacking machine head 8 rotating to drive all the mud discharging screw rods 7 to rotate, the cutter head 81 cutting the soil mass 1, the cut soil mass 1 entering a soil pressure cabin 82 arranged at the other end of the pipe-jacking machine head 8, and the soil mass 1 in the soil pressure cabin 82 being discharged to the originating well 2 or the receiving well 3 via the mud discharging screw rods 7 and the mud discharging pipes 6; and S6, more than two prefabricated pipe joints 9 following the pipe-jacking machine head 8 are jacked into the soil mass 1 with the thrusting apparatus 4 until all the mud discharging screw rods 7, the guide bars 5 and the pipe-jacking machine head 8 are jacked out into the receiving well 3 to complete laying of an underground pipeline.

According to an optional implementation mode of the present invention, one end of each of the guide bars 5 in the S2 is provided with a loosening agent spraying apparatus, and when the guide bar 5 is driven into the soil mass 1, the loosening agent spraying apparatus sprays a loosening agent to soil.

According to an optional implementation mode of the present invention, the laser orientation instrument is independently mounted on concrete at the bottom of the originating well 2.

According to an optional implementation mode of the present invention, the pipe-jacking machine head 8 is a tunneling cutting type pipe-jacking machine head 8.

According to an optional implementation mode of the present invention, the pipe-jacking machine head 8 is an extrusion type pipe-jacking machine head 8.

According to an optional implementation mode of the present invention, in the S5, when the cutter head 81 rotates towards a direction, the soil mass 1 in the soil pressure cabin 82 is discharged to the originating well 2 via the mud discharging screw rods 7 and the mud discharging pipes 6.

According to an optional implementation mode of the present invention, in the S5, when the cutter head 81 rotates towards a direction, the soil mass 1 in the soil pressure cabin 82 is discharged to the receiving well 3 via the mud discharging screw rods 7 and the mud discharging pipes 6.

The thrusting apparatus 4 of the present invention is small in size, light in weight, convenient to operate and high in construction efficiency, may perform construction in a narrow roadway space, may perform construction in a working well with a diameter of 1800 mm, and is suitable for a pipeline project with a relatively small diameter; wide stratums, for example various soil layers such as flow plastic clay, soft clay, hard pan, a sand bed, a gravel bed with a diameter smaller than 50 mm, may be suitable for the construction method of the present invention; the rotating direction of the cutter head 81 may be controlled according to an actual condition, so that the soil mass 1 is controlled to be discharged to the originating well 2 or the receiving well 3, it is convenient to process the abandoned soil or mud, and the slurry disposal cost is lowered; and the construction quality is excellent; as guided by an advanced laser guiding drill bit 51, a straightness error of the guide bar 5 is +/−2.5 cm; after construction of the pipeline, the straightness is high without disjoint and water leakage, water leakage between joints due to excessive balanced deviation rectification of mud and water is avoided, and a strict requirement on a gravity flow is met fully.

Components, structures of which are not described in detail, in the present invention are universal standard components or components known to those skilled in the art, and their structures or principles may be known by those skilled in the art via technical manuals or acquired by conventional experimental methods.

Finally, it is to be noted that the above embodiments are merely used to explain the technical scheme of the present invention rather than limiting the protection scope of the present invention. Despite reference to the preferred embodiments to make a detailed description for the present invention, it will be understood by those skilled in the art that they still can modify the technical scheme of the present invention or make equivalent substitutions on the technical scheme without departing the substance and scope of the technical scheme of the present invention.

The invention claimed is:

1. A guiding type pipe-jacking construction method, the method comprising the following steps:
   S1, in an originating well, perforating an operation hole in an inner wall of the originating well, and meanwhile, applying concrete in the periphery of the operation hole;
   S2, mounting a laser orientation instrument and a thrusting apparatus in the originating well, the laser orientation instrument and a laser guided drill bit being connected wirelessly, the laser guided drill bit being connected with one end of one of guide bars, driving the guide bar connected with the laser guided drill bit into the opened operation hole with the thrusting apparatus, and then driving more than two guide bars successively into the operation hole with the thrusting apparatus until one end of one of the guide bars enters a receiving well;
   S3, mounting a funnel-shaped pushing head at one end of a mud discharging pipe, jacking the mud discharging pipe provided with the pushing head following the guide bar into the soil mass with the thrusting apparatus, the pushing head leaning against one end of one of the guide bars, and then jacking more than two mud discharging pipes following the mud discharging pipe provided with the pushing head into the soil mass with the thrusting apparatus until all the guide bars are jacked out into the receiving well, and moving all the guide bars entering the receiving well out of the receiving well;
   S4, when one of the mud discharging pipes enters the receiving well, jacking more than two mud discharging screw rods into the mud discharging pipes with the thrusting apparatus until one of the mud discharging screw rods enters the receiving well;
   S5, jacking a pipe-jacking machine head following the mud discharging pipe at the tail end into the hole with the thrusting apparatus, a cutter head arranged at one end of the pipe-jacking machine head rotating to drive all the mud discharging screw rods to rotate, the cutter head cutting the soil mass, the cut soil mass entering a soil pressure cabin arranged at the other end of the pipe-jacking machine head, and the soil mass in the soil pressure cabin being discharged to the originating well or the receiving well via the mud discharging screw rods and the mud discharging pipes; and
   S6, jacking more than two prefabricated pipe joints following the pipe-jacking machine head into the soil mass with the thrusting apparatus until all the mud discharging screw rods, the guide bars and the pipe-jacking machine head are jacked out into the receiving well to complete laying of an underground pipeline.

2. The guiding type pipe-jacking construction method according to claim 1, wherein one end of each of the guide bars in the S2 is provided with a loosening agent spraying apparatus, and when the guide bar is driven into the soil mass, the loosening agent spraying apparatus sprays a loosening agent to soil.

3. The guiding type pipe-jacking construction method according to claim 1, wherein the laser orientation instrument is independently mounted on concrete at the bottom of the originating well.

4. The guiding type pipe-jacking construction method according to claim 1, wherein the pipe-jacking machine head is a tunneling cutting type pipe-jacking machine head.

5. The guiding type pipe-jacking construction method according to claim 1, wherein the pipe-jacking machine head is an extrusion type pipe-jacking machine head.

6. The guiding type pipe-jacking construction method according to claim 1, wherein in the S5, when the cutter head rotates towards a direction, the soil mass in the soil pressure cabin is discharged to the originating well via the mud discharging screw rods and the mud discharging pipes.

7. The guiding type pipe-jacking construction method according to claim 1, wherein when the cutter head rotates towards a direction, the soil mass in the soil pressure cabin is discharged to the receiving well via the mud discharging screw rods and the mud discharging pipes.

* * * * *